United States Patent
Ayers et al.

(10) Patent No.: US 10,689,824 B2
(45) Date of Patent: Jun. 23, 2020

(54) SYNTHETIC GROUND COVER SYSTEM FOR EROSION PROTECTION FOR USE WITH OR WITHOUT A SAND/SOIL BALLAST

(75) Inventors: Michael Ayers, Alpharetta, GA (US); Jose Urrutia, Suwanee, GA (US)

(73) Assignee: Watershed Geosynthetics LLC, Alpharetta, GA (US)

( * ) Notice: Subject to any disclaimer, the term of this patent is extended or adjusted under 35 U.S.C. 154(b) by 0 days.

(21) Appl. No.: 13/231,067

(22) Filed: Sep. 13, 2011

(65) Prior Publication Data

US 2012/0063854 A1    Mar. 15, 2012

Related U.S. Application Data

(60) Provisional application No. 61/382,307, filed on Sep. 13, 2010.

(51) Int. Cl.
  *E02D 17/20*    (2006.01)
  *E02D 3/00*    (2006.01)
  (Continued)

(52) U.S. Cl.
  CPC ............ *E02D 17/202* (2013.01); *B09C 1/005* (2013.01); *B32B 5/028* (2013.01); *B32B 5/26* (2013.01);
  (Continued)

(58) Field of Classification Search
  CPC ....... E02D 17/20; E02D 3/00; E02D 2450/10; E02D 29/14; E02D 31/004; E02D 31/025
  (Continued)

(56) References Cited

U.S. PATENT DOCUMENTS 3,315,408 A * 4/1967 Fisher ................ A01G 13/0268
  47/9
4,181,450 A * 1/1980 Rasen ..................... E02B 3/043
  405/19
(Continued)

FOREIGN PATENT DOCUMENTS

WO     WO8901076           2/1989
WO     WO 8901076 A1 *    2/1989
(Continued)

OTHER PUBLICATIONS

International Preliminary Report on Patentability; Application Serial No. PCT/US2011/051312; dated Mar. 28, 2013; 6 pages; International Bureau of WIPO, 34, chemin des Colombettes, 1211 Geneva 20, Switzerland.
(Continued)

*Primary Examiner* — Benjamin F Fiorello
*Assistant Examiner* — Edwin J Toledo-Duran
(74) *Attorney, Agent, or Firm* — Gardner Groff & Greenwald, PC

(57) ABSTRACT

A system for covering various types of ground where water and wind erosion protection are needed comprises a composite of at least one geotextile tufted or knitted with synthetic yarns (forming a synthetic turf), an open grid mesh, and a geo-filter (filter fabric). The filter fabric is positioned in direct contact with the ground surface, the open grid mesh is positioned over the filter fabric, and the synthetic turf is positioned over the open grid mesh. The system provides a beneficial erosion protection that does not require maintenance and can be used to cover slopes without requiring vegetative support and/or a topsoil layer. An optional sand layer can be placed atop the synthetic turf as desired as infill to ballast the material and protect the system against wind uplift.

7 Claims, 1 Drawing Sheet

(51) Int. Cl.
- *E02D 29/14* (2006.01)
- *B09C 1/00* (2006.01)
- *B32B 5/26* (2006.01)
- *B32B 5/02* (2006.01)

(52) U.S. Cl.
CPC ... *B32B 2250/20* (2013.01); *B32B 2262/0253* (2013.01); *B32B 2410/00* (2013.01)

(58) Field of Classification Search
USPC ...... 405/302.4, 302.6, 302.7, 15, 16, 19, 36, 405/284
See application file for complete search history.

(56) References Cited

U.S. PATENT DOCUMENTS

| | | | |
|---|---|---|---|
| 4,444,815 A * | 4/1984 | Friedrich | E01C 13/08 428/17 |
| 4,610,568 A * | 9/1986 | Koerner | E02D 17/202 405/15 |
| 4,752,402 A * | 6/1988 | Gray | B01D 24/26 210/747.9 |
| 4,840,515 A * | 6/1989 | Freese | E02B 11/005 405/36 |
| 4,917,536 A * | 4/1990 | Glasser | E02B 11/00 405/36 |
| 4,946,719 A | 8/1990 | Dempsey | |
| 5,404,671 A * | 4/1995 | Farrow, Jr. | A01C 1/046 47/1.01 R |
| 5,736,237 A | 4/1998 | Rhee et al. | |
| 5,788,413 A | 8/1998 | Peggs | |
| 5,849,645 A * | 12/1998 | Lancaster | E02B 3/04 442/5 |
| 6,221,445 B1 * | 4/2001 | Jones | E01C 13/08 405/36 |
| 6,338,885 B1 * | 1/2002 | Prevost | 428/17 |
| 6,422,787 B1 * | 7/2002 | Mikell | E02B 3/126 405/15 |
| 6,524,424 B2 * | 2/2003 | Edwards et al. | 156/292 |
| 6,800,339 B2 * | 10/2004 | Motz | E01C 13/08 405/36 |
| 6,858,272 B2 * | 2/2005 | Squires | E01C 13/08 273/DIG. 13 |
| 6,877,932 B2 | 4/2005 | Prevost | |
| 6,929,425 B1 * | 8/2005 | Kimberlin | C09K 17/52 405/302.4 |
| 7,682,105 B2 | 3/2010 | Ayers et al. | |
| 7,740,420 B2 * | 6/2010 | Jones | E02D 29/0225 405/15 |
| 7,758,281 B2 * | 7/2010 | Knox | E01C 13/08 405/36 |
| 2003/0082359 A1 * | 5/2003 | Scott | E01C 13/02 428/221 |
| 2004/0086664 A1 | 5/2004 | Seaton | |
| 2005/0031803 A1 * | 2/2005 | Prevost | A01M 29/00 428/17 |
| 2005/0238433 A1 | 10/2005 | Daluise | |
| 2006/0045995 A1 * | 3/2006 | Dipple | 428/17 |
| 2007/0269275 A1 * | 11/2007 | Kimberlin | E02D 17/20 405/302.6 |

FOREIGN PATENT DOCUMENTS

| | | |
|---|---|---|
| WO | WO2005042846 | 5/2005 |
| WO | WO 2005042846 A1 * | 5/2005 |
| WO | WO2007095979 | 8/2007 |
| WO | WO2008033516 | 3/2008 |
| WO | WO 2008033516 A2 * | 3/2008 |

OTHER PUBLICATIONS

International Preliminary Report on Patentability; Application Serial No. PCT/US2011/051341; Mar. 28, 2013; 7 pages; International Bureau of WIPO, 34, chemin des Colombettes, 1211 Geneva 20, Switzerland.

International Search Report; dated Jan. 12, 2012; 10 pages, International Searching Authority of the European Patent Office; PCT Patent Application No. PCT/US2011/051312.

* cited by examiner

SYNTHETIC GROUND COVER SYSTEM FOR EROSION PROTECTION FOR USE WITH OR WITHOUT A SAND/SOIL BALLAST

CROSS REFERENCE TO RELATED APPLICATION

This application claims the priority benefit of U.S. Provisional Patent Application Ser. No. 61/382,307, filed Sep. 13, 2010, which is hereby incorporated herein by reference.

BACKGROUND

The prior art discloses systems for erosion protection that typically take the form of a combination of synthetic mat and natural grass. Additionally, the prior art generally requires multiple anchors to resist wind uplift and erosion forces on the synthetic mat. Thus, the industry continues to search for improved erosion protection systems which are effective, economical and meet the various local, state and federal environmental laws, rules and guidelines for these systems.

Artificial grass has been extensively used in sport arenas (playing fields) as well as along airport runways and in general landscaping. A primary consideration of artificial turf playing fields is the ability of the field to drain. Examples of prior art in synthetic grass drainage are U.S. Pat. Nos. 5,876,745; 6,858,272; 6,877,932 and 6,946,181. However, these applications are generally only for field playing surfaces where the ground is substantially flat and the concern is only with the ability to improve field playing conditions.

The drainage use in the prior art artificial turf deals principally with slow infiltration of flat surfaces to avoid inundation of the field, and such drainage use generally cannot handle the very large and rapid run-off that would occur on very large and steep sideslopes of natural or man-made ground topography, such as landfills, stockpiles, berms, embankments, levees, drainage channels, mine tailing piles, etc.

SUMMARY OF THE INVENTION

Briefly described, the present invention provides a new and useful system for covering various types of ground where water and wind erosion protection are needed. More particularly, the cover system of this invention comprises a composite of at least one geotextile tufted or knitted with synthetic yarns (forming a synthetic turf), an open grid mesh, and a geo-filter (filter fabric). Preferably, the filter fabric is positioned in direct contact with the ground surface, the open grid mesh is positioned over the filter fabric, and the synthetic turf is positioned over the open grid mesh.

It is to be understood that this invention is not limited to the specific devices, methods, conditions, or parameters described and/or shown herein, and that the terminology used herein is for the purpose of describing particular embodiments by way of example only. Thus, the terminology is intended to be broadly construed and is not intended to be limiting of the claimed invention. For example, as used in the specification including the appended claims, the singular forms "a," "an," and "one" include the plural, the term "or" means "and/or," and reference to a particular numerical value includes at least that particular value, unless the context clearly dictates otherwise. In addition, any methods described herein are not intended to be limited to the sequence of steps described but can be carried out in other sequences, unless expressly stated otherwise herein.

BRIEF DESCRIPTION OF THE DRAWING FIGURES

DETAILED DESCRIPTION

The present invention provides an erosion protection layer for use in embankments, levees, water channels, landfills and other steep topographic ground conditions.

In the present invention, a synthetic grass is used in combination with an open grid mesh and a filter geotextile to provide a new and useful ground cover system, while also providing a beneficial erosion protection system that does not require maintenance. This combination (sometimes referred to as a composite material) can be used on covering slopes.

With the cover system of this invention, owners and operators can realize significant cost savings by constructing a cover system with synthetic grass that does not require the vegetative support and topsoil layer of the typical known final cover systems.

The cover system of this invention is preferably designed with (1) a lower geo-filter placed over the soil intermediate cover; (2) an open mesh grid positioned over the geo-filter; and (3) a synthetic grass positioned over the open mesh grid. Optionally, the synthetic turf is engineered to have polyethylene fibers with a length of 2 to 2.5 inches tufted into two fabrics consisting of needle punch non-woven polyester and woven polypropylene geotextiles. Optionally, a sand layer of about 0.5 to about 1.0 inches can be placed atop the synthetic turf as desired as infill to ballast the material and protect the system against wind uplift. The sand will provide additional protection of the geotextiles against ultraviolet light. However, preferably sand is not used and no additional ballast is employed to secure the cover system in place when the tufting gauge space density and pile height will provide UV screening protection of the underlying geotextile(s).

With this invention, an anchoring system typically associated with exposed covers is optional. Moreover, the turf can be ballasted or not, as desired. If ballasted, one can ballast the turf with approximately about 0.5 to about 1.0 inch of sand infill, which produces a weight of about 5 to about 10 pounds per square foot.

Figure 1:
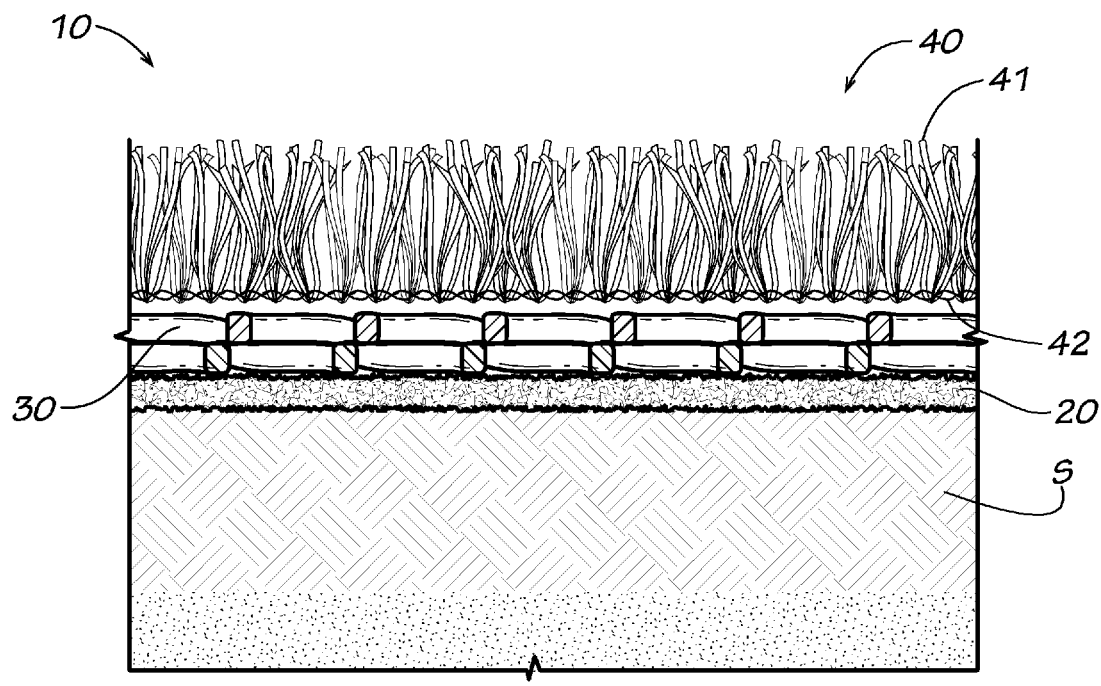
FIG. 1 is a schematic, sectional view of a synthetic ground cover system according to the present invention.
Figure 2:
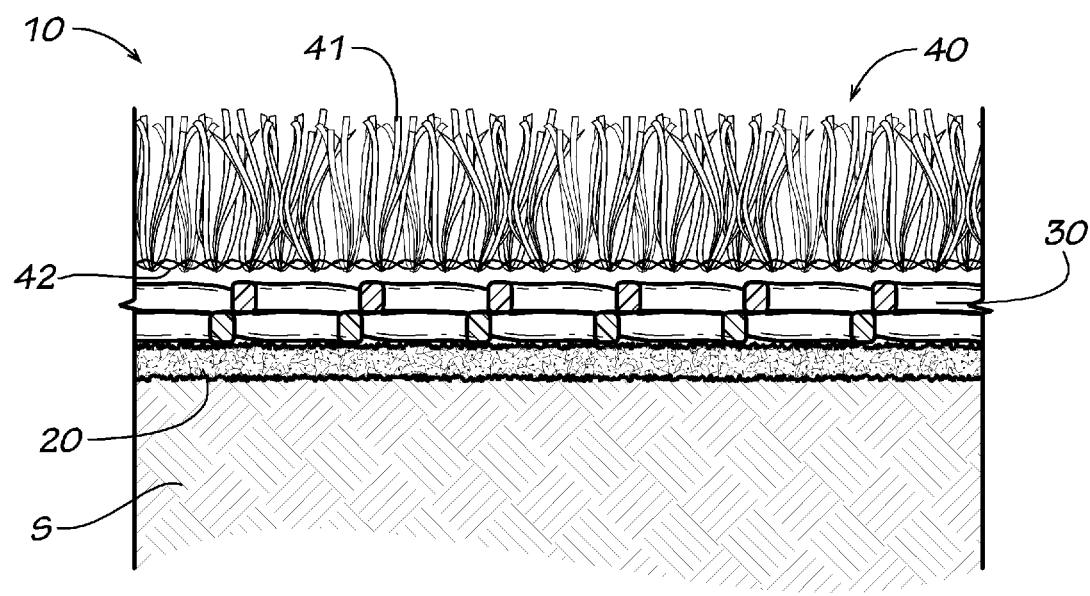
FIG. 2 is a detailed schematic, sectional view of a portion of the closure system of FIG. 1.

FIG. 1 is a schematic, sectional view of a closure system according the present invention and showing the soil surface covered with the present ground cover erosion control system 10. The system 10 includes a filter fabric 20, an open grid mesh or geo-net 30 and a synthetic turf 40.

Preferably, the filter fabric 20 comprises a woven or non-woven synthetic fabric.

Preferably, the open grid mesh comprises a synthetic drainage system with drainage capacity to handle high-intensity precipitation. The drainage system serves to prevent erosion of the ballast and/or the shearing stresses on the turf. This is different than prior art that uses gravel layers used in turf field applications.

Preferably, the synthetic turf 40 is used as the upper component of the synthetic ground cover system. It can be constructed using a knitting or tufting machine that may use over 1,000 needles to produce a turf width of about 15 feet.

Preferably, the synthetic turf includes synthetic grass blades 41 comprising polyethylene monofilament fibers tufted to have a blade length of between about 1½ inches and 4 inches. More preferably, the synthetic grass blades 41 are tufted to have a blade length of between about 2 inches and 3 inches. Most preferably, the synthetic grass blades 41 are tufted to have a blade length of about 2½ inches.

Optionally, the synthetic grass blades 41 are tufted to have a density of between about 20 ounces/square yard and about 120 ounces/square yard. Preferably, the synthetic grass blades have a thickness of at least about 100 microns.

The synthetic grass blades 41 are tufted into a substrate 42 comprising of a synthetic woven or non-woven fabric. Optionally, a backing 43 can be secured to the substrate to reinforce the substrate and better secure the synthetic grass blades.

The chemical composition of the synthetic turf components 41 should be selected to resist exposure to sunlight, which generates heat and contains ultraviolet radiation. The polymer yarns should not become brittle when subjected to low temperatures. The selection of the synthetic grass color and texture should be aesthetically pleasing.

The actual grass-like components preferably consist of green polyethylene fibers 41 of about 2 to about 2.5 inches in length tufted into a woven or non-woven geotextile(s). For added strength in severely steep sideslopes, an additional mesh backing can be tufted for improving dimensional stability. The polyethylene grass filaments preferably have an extended operational life of at least 15 years.

This invention combines the use of a synthetic grass to provide a pleasant visual appearance, erosion protection with very minimal maintenance. The invention incorporates a synthetic drainage that can handle the very rapid run-off that provides the stability of the ballast and turf. Thus, the cover system of this invention can be installed on very steep slopes which typically occur in embankments, levees, dams, landfills and stockpiles.

There are many advantages to the cover system of this invention. The cover system reduces construction costs, reduces annual operation and maintenance costs while providing superior and reliable/consistent aesthetics. It also reduces the need for expensive riprap channels and drainage benches, with substantially no erosion or siltation problems, even during severe weather. It is a good choice in sensitive areas where soil erosion and sedimentation are major concerns because soil loss is substantially reduced. It also eliminates the need for siltation ponds and associated environmental construction impacts. It allows for steeper slopes, because there will be a reduced risk of soil stability problems, such as resulting from.

While the invention has been shown and described in exemplary forms, it will be apparent to those skilled in the art that many modifications, additions, and deletions can be made therein without departing from the spirit and scope of the invention as defined by the following claims.

What is claimed is:

1. A ground cover system for protecting ground soil on steep topographic ground against erosion, wherein the ground cover system comprises:
   a synthetic grass which comprises a composite of one or more geo-textiles tufted with synthetic yarns;
   at least one filter fabric to be placed directly atop the ground soil, and
   an open grid mesh sandwiched between the synthetic grass and the filter fabric, with an upper portion of the open grid mesh facing and placed directly against the synthetic grass and a lower portion of the open grid mesh facing and placed against the filter fabric,
   wherein the synthetic grass has blades with an average length of between about 1.25 and 3 inches, wherein the synthetic grass has a density of between about 20 ounces per square yard and 120 ounces per square yard, and wherein the open grid mesh comprises a synthetic drainage system for transmitting high-volume precipitation from atop the synthetic grass downward into the open grid mesh for absorption into the underlying ground soil to reduce precipitation runoff from the steep topographic ground.

2. A ground cover system as defined by claim 1 wherein the at least one filter fabric comprises two filter fabric layers.

3. A ground cover system as defined by claim 1 wherein the at least one filter fabric comprises woven synthetic fabric.

4. A ground cover system as defined by claim 1 wherein the at least one filter fabric comprises non-woven synthetic fabric.

5. A ground cover system as defined by claim 1 wherein the synthetic grass comprises blades with a thickness of at least about 100 microns.

6. A ground cover system for protecting ground soil on steep topographic ground against erosion, wherein the ground cover system comprises:
   at least one filter fabric placed directly atop the ground soil in a first step;
   an open grid mesh placed atop the filter fabric in a second step; and
   a synthetic grass placed directly atop the open grid mesh in a third step, wherein the open grid mesh is sandwiched between the synthetic grass and the filter fabric, with an upper portion of the open grid mesh facing and placed against the synthetic grass and a lower portion of the open grid mesh facing and placed against the filter fabric,
   wherein the synthetic grass comprises a composite of one or more geo-textiles tufted with synthetic yarns, wherein the synthetic grass has blades with an average length of between about 1.25 and 3 inches, wherein the synthetic grass has a density of between about 20 ounces per square yard and 120 ounces per square yard, and
   wherein the open grid mesh comprises a synthetic drainage system for transmitting high-volume precipitation from atop the synthetic grass downward into the open grid mesh for absorption into the underlying ground soil to reduce precipitation runoff from the steep topographic ground.

7. A ground cover system as defined by claim 6 wherein the steep topographic ground is formed by a landfill, stockpile, berm, embankment, levee, drainage channel, or mine tailing pile.

* * * * *